Patented Dec. 15, 1953

2,662,841

UNITED STATES PATENT OFFICE 2,662,841

WATER-INSOLUBLE SALTS OF DITHIOCARBAMIC ACID MADE RAPIDLY WATER DISPERSIBLE AND COMPOSITIONS THEREOF

Elmer A. Fike, Nitro, W. Va., and Harold E. Bruner, Akron, Ohio, assignors to Monsanto Chemical Company, St. Louis, Mo., a corporation of Delaware No Drawing. Application January 28, 1949,
Serial No. 73,448

12 Claims. (Cl. 167—22)

This invention relates to new and novel compositions of matter. More particularly it relates to new and novel improvements in compositions comprising a dithiocarbamate in a readily dispersible form.

Dithiocarbamates, particularly the heavy metal salts, have long been known in the art as materials which are particularly difficult to disperse and as a result their usage in agricultural sprays and as rubber latex vulcanization accelerators has involved considerable inconveniences. It has been necessary to admix the dithiocarbamates with relatively large quantities of agents to aid the dispersion and wet the particles in view of the fact that small quantities, e. g. 2% or less, usually result in a product which does not disperse readily. Vigorously agitating the heavy metal salts of the dithiocarbamates with water, as for example, in a ball mill for many hours, fails to produce a satisfactory wetted product for dispersing purposes. Furthermore, by incorporating a small amount of a surface active agent in the previously described ball milled water-dithiocarbamate mixture generally yields a product characterized by lack of free flowing properties and exhibiting considerable lumpiness.

In accordance with the present invention it has been discovered that new and unexpected properties are exhibited by a composite of water and a water insoluble salt of a dithiocarbamic acid obtained by precipitating a water insoluble salt of a dithiocarbamic acid from aqueous solution. Precipitation may be carried out either by adding the metal salt or a solution thereof to an aqueous solution of a water soluble dithiocarbamate or by adding the latter solution to an aqueous or water miscible solution of a salt of the precipitating metal. In either case a dispersion is formed initially from which the solids may be separated by filtering or decanting off the supernatant liquid after setting. It has been found that a water insoluble salt of a dithiocarbamic acid imbibes considerable water when precipitated from an aqueous medium and that the product after filtering or decanting off the supernatant liquid is completely reversible and may be redispersed in water with ease. The individual particles of the undried product are thoroughly wetted and the return to their original condition presents no difficulty. More important, however, is the fact the wet reversible product possesses surprising superior properties for applications requiring aqueous dispersions of a dithiocarbamate. Apparently drying results in an irreversible change. While the invention is not limited to any theory of the effects of drying or non-drying, it has not been possible to attain the results which characterize the products of this invention with products which have been subjected to a drying operation.

In the preferred embodiment of the invention the wetted reversible composite of metal dithiocarbamate and water is admixed with a small amount of one or more products described as surface active agents. This permits the formation of a free flowing creamy paste which disperses in water with extreme rapidity to form dispersions consisting of finely divided particles.

By surface active agent is meant a material which modifies the properties of the surface layer of one phase in contact with another (F. D. Snell, vol. 35, p. 107, Ind. & Eng. Chemistry), in this particular instance an insoluble dithiocarbamate in relation to water. The surface active agents which have been found useful include wetting agents, that is materials which materially reduce the surface tension of water, dispersing or deflocculating agents, that is materials which are capable of breaking up agglomerates of solid particles and suspend them in water without materially reducing the surface tension of water, and peptizing agents.

Among the dispersing or deflocculating agents which are particularly satisfactory are the formaldehyde-sulfonated aromatic hydrocarbon condensation products. These materials are ordinarily prepared by first sulfonating an aromatic hydrocarbon such as benzene, toluene, xylene, naphthalene, methyl naphthalene, and the like, and then condensing with formaldehyde. As a typical example of the preparation of these materials substantially one molecular proportion of a sulfonated naphthalene, prepared by reacting substantially 2 molecular proportions of sulfuric acid with 1 molecular proportion of naphthalene, may be condensed with substantially 0.5 molecular proportions of formaldehyde at 70°–100° C. While said described condensation product may be employed, per se, it is preferable to neutralize the product to a pH of 7 with an alkaline material such as ammonia, sodium carbonate, sodium hydroxide, and the like. Other neutralized formaldehyde-sulfonated aromatic hydrocarbons are particularly satisfactory, for example, the neutralized condensation products disclosed by O. Schmidt in U. S. Patent 1,336,759. The dispersions formed with these materials are substantially foamless.

Other dispersants or deflocculants which may be employed satisfactorily are the water soluble alkali metal salts of polymerized alkyl aryl sulfonic acids, sodium and potassium tetrahydro naphthalene sulfates, sulfonated aliphatic esters, sulfolignin and the like.

Among the peptizing agents which may be incorporated in the wetted reversible composite, but preferably in conjunction with a different type surface active agent, include the primary, secondary, and tertiary aliphatic and alicyclic amines.

Wetting agents which effectively wet the dithiocarbamates when incorporated in the dithiocarbamate precipitate-water composite such that a readily dispersible composition is obtained are those materials which give a Draves wetting time (described in the 1944 Yearbook of the American Association of Textile Chemists and Colorists, volume XXI, p. 199) of 10.5 seconds or less in an aqueous solution containing 0.5% by weight of the wetting agent. Among the preferred group of wetting agents are the alkali metal salts of mono-, di-, and trisulfonated aromatic hydrocarbons of the benzene series, such as benzene, toluene, xylene, wherein the aromatic nucleus also contains an aliphatic side chain containing from 10 to 18 carbon atoms. Typical examples are the sodium and potassium salts of decyl-, dodecyl-, tetradecyl-, octadecyl-benzene sulfonic acids, as well as the corresponding di- or tri-sulfonated product. Mixtures of these organic sulfonate wetting agents may be employed also. While these organic sulfonates effectively wet the dithiocarbamates and produce wetted reversible composites, it is preferred to include a dispersing or deflocculating agent in conjunction with these wetting agents.

Additional examples of organic sulfonate wetting agents and organic sulfates, also, which effectively wet the dithiocarbamates and which have been found useful, particularly when employed in conjunction with a dispersant or deflocculant, are the sulfosuccinic acid dialkyl esters such as sodium dihexyl sulfosuccinate, sodium dioctyl sulfosuccinate, sodium didodecyl sulfosuccinate, and the like; dialkyl-cyclohexylamine dodecyl sulfate and similar products wherein the alkyl groups contain from 1 to 4 carbon atoms and the dodecyl group is replaced by alkyl groups from 10 to 18 carbon atoms such as dimethyl-cyclohexylamine octadecyl sulfate, dibutyl-cyclohexylamine decyl sulfate and the like; alkylated biphenyl sodium monosulfonates such as monobutyl-, monoamyl-, or mono-octyl-biphenyl sodium monosulfonate; dialkylated phenyl phenol sodium disulfonates such as dibutyl phenyl phenol sodium disulfonate, dihexyl phenyl phenol sodium disulfonate; butyl naphthalene sodium monosulfonate, isopropyl naphthalene sodium monosulfonate, decyl or dodecyl sodium sulfate and the like.

Other surface active agents may be incorporated in the new wetted reversible composition, as for example, the non-resinous reaction products of ethylene oxide and abietic acid or compositions containing abietic acid such as rosin, rosin oils, and tall oils; fatty acid esters of amino alcohols such as stearic acid and lauric acid esters of 2-amino-3-hexanol and 2-amino-2-methyl-1,3-propane diol; aliphatic sulfates such as sodium lauryl sulfate, sodium oleyl sulfate; esters of sulfated fatty acids and their alkali metal salts; sorbitan monolaurate, sorbitan monostearate, mannitan monolaurate, mannitan monostearate; fatty acid esters such as oleic acid esters of hydroxy ethane sulfonic acid and their sulfonate salts.

The dithiocarbamates contemplated are the water insoluble salts of the dithiocarbamic acids, particularly the zinc, iron, mercury, and copper salts. Dithiocarbamic acids are those products resulting from the interaction of carbon disulfide with mono-amines, di-amines, and cyano substituted mono- and di-amines which contain at least one replaceable hydrogen atom attached to the amine nitrogen atom. Among the amines which are satisfactory for this purpose are the primary and secondary amines which contain as substituents such groups as methyl, ethyl, ethanol, propyl, isopropyl, butyl, isobutyl, amyl, cyclohexyl, methyl cyclohexyl, benzyl, phenethyl, phenyl, tolyl, xylyl, allyl, crotyl, aminoethyl, the cyclic amino compounds such as piperidine, methyl piperidine, and their cyano substituted analogues such as cyanomethyl, cyanoethyl, cyanopropyl, and the like. Among the diamines which are satisfactory are ethylene diamine, propylene diamine, butylene diamine, ethamino pentane, hexamethylene diamine, ethylene bis N,N'-(2-cyanoethyl amine), ethylene bis N,N'-(2-cyanopropyl amine), ethylene bis N,N'-(2-cyanobutyl amine), hexamethylene bis N,N'-(2-cyanoethyl amine) and the like. As additional specific examples of the dithiocarbamates are the disinfectants of W. H. Tisdale et al., Re. 22,750.

As exemplary of the preparation of the new readily dispersible compositions, the following is illustrative and is not to be construed as limitative thereof.

EXAMPLE 1

Zinc ethylene bis N,N'-(2-cyanoethyl dithiocarbamate) was prepared by adding an aqueous solution of zinc sulfate to an aqueous solution of sodium ethylene bis N,N'-(2-cyanoethyl dithiocarbamate) in the usual manner. The zinc salt was then filtered off by means of a centrifugal wringer and after washing, the wringer cake was analyzed and found to contain approximately 40% by weight zinc ethylene bis N,N'-(2-cyanoethyl dithiocarbamate), the remainder being water. To substantially 4540 parts by weight of the above described wringer cake composite was mixed 50 parts by weight of a substantially 50% aqueous solution of an ammonia neutralized formaldehyde-sulfonated naphthalene condensation product. There was obtained a thin free flowing, non-foaming creamy paste which readily dispersed in water, and which was further characterized by an extremely fine state of subdivision of particles and good storage stability. Such a readily dispersible paste composition is particularly adaptable to rubber latex compounding as well as agricultural spray formations.

A more concentrated dithiocarbamate wringer cake or filter cake composite may be obtained by the addition of a small amount of dispersing agent to the solution containing the soluble dithiocarbamate salt prior to the addition of the precipitating agent. Upon addition of the precipitant, and subsequently filtering, a lowering in water content in the filter cake composite of as much as 25% may be obtained without adversely affecting the dispersing or free flowing properties. The filter cake composite may be further reduced in water content, if so desired, by working up the cake with additional dispersing agent and re-filtering. For optimum dispersing properties it is preferable to add a further quantity of dispersant or deflocculant.

As further exemplary of the invention, wetting agents, that is those products which materially reduce the surface tension of an aqueous solution, for example, substances which give a Draves wetting time of 10.5 seconds or less in an aqueous solution containing 0.5% by weight of the wetting agent, may be incorporated in the dithiocarbamate filter cake composite. As exemplary of this particular embodiment of the invention the following is illustrative and is not to be construed as limitative thereof.

EXAMPLE 2

Iron dimethyl dithiocarbamate was prepared by adding an aqueous solution of ferric sulfate to an aqueous solution of sodium dimethyl dithiocarbamate in the usual manner. The iron salt was then filtered off, and after washing the filter cake was analyzed and found to contain approximately 35% by weight iron dimethyl dithiocarbamate, the remainder being water.

The above described dithiocarbamate composite was completely reversible and could be redispersed in aqueous medium by efficient agitation. Admixture with a small amount, as for example 0.94% on the iron dimethyl dithiocarbamate content, of dodecyl benzene sodium sulfonate noticeably increased the rate of dispersion. It should be noted, however, that in either case the dispersion soon flocculates and the dithiocarbamate settles out nearly as rapidly as the freshly precipitated dispersion.

The following is representative of the preparation of a composite which on reversion to dispersed form produces a stable dispersion.

To substantially 4540 parts by weight of the above described filter cake composite was mixed 50 parts by weight of substantially a 50% solution of an ammonia neutralized formaldehyde-sulfonated naphthalene condensation product and 50 parts by weight of a 30% aqueous solution of dodecyl benzene monosodium sulfonate. There was obtained a free flowing thin creamy paste which readily dispersed in water without exhibiting flocculation and which was made up of extremely finely divided particles. The paste exhibited remarkable stability and retention of particle size in storage.

A particularly important advantage of the wet reversible iron salt is the freedom from fire hazard. Certain metal salts of the dithiocarbamates, especially the iron salt, are highly flammable and may even undergo spontaneous combustion. However, the products of this invention are highly resistant to combustion.

EXAMPLE 3

Zinc dimethyl dithiocarbamate was prepared by adding a solution of zinc sulfate to an aqueous solution of sodium dimethyl dithiocarbamate in the usual manner. The zinc salt was then filtered off, and after washing the filter cake was analyzed and found to contain approximately 52% by weight zinc dimethyl dithiocarbamate, the remainder being water.

To substantially 4540 parts by weight of the above described dithiocarbamate filter cake composite was mixed 40 parts by weight of substantially a 50% solution of an ammonia neutralized formaldehyde-sulfonated naphthalene condensation product and 40 parts by weight of a 30% aqueous solution of dodecyl benzene monosodium sulfonate. There was obtained a free flowing thin creamy paste possessing excellent dispersing properties in water with no tendency to settle out or flocculate. After a 5 month storage period this paste formed no agglomerates and was readily dispersible in water.

EXAMPLE 4

To 675 parts by weight of a 42.5% (substantially 2 molecular proportions) sodium dimethyl dithiocarbamate solution was added with stirring 179.4 parts by weight (substantially 1 molecular proportion) of powdered zinc sulfate monohydrate. Thereto while still agitating was added 16 parts by weight of an aqueous solution containing about 15% dodecyl benzene monosodium sulfonate, about 13% of an ammonia neutralized formaldehyde-sulfonated naphthalene condensation product, and about 25% of a non-resinous ethylene oxide-abietic acid condensation product. A creamy paste developed rapidly which upon analysis consisted of substantially by weight 35.1% zinc dimethyl dithiocarbamate, 16.6% sodium sulfate, and about 47.5% water. Approximately 1% of the paste, by weight, consisted of the mixture of dispersing and wetting agents. This paste readily dispersed in water to form an excellent spray composition. The paste possessed good flowing properties and exhibited good retention of particle size in storage. This paste may be further concentrated by filtering off some of the aqueous diluent by means of a centrifugal wringer.

EXAMPLE 5

The iron salt of ethylene bis N,N'-(2-cyanoethyl dithiocarbamic acid) was prepared by adding a solution of ferric sulfate to an aqueous solution of the sodium dithiocarbamate in the usual manner. The iron salt was filtered off, and after washing the filter cake was analyzed and found to contain 35% iron salt of ethylene bis N,N'-(2-cyanoethyl dithiocarbamic acid) and the remainder being water.

To 4767 parts by weight of the above described filter cake composite was mixed 140 parts by weight of a 30% aqueous solution of dodecyl benzene monosodium sulfonate and 60 parts by weight of substantially a 50% aqueous solution of an ammonia neutralized formaldehyde-sulfonated naphthalene condensation product. A thin creamy free flowing paste was obtained which readily dispersed in water to form a stable uniform dispersion of extremely finely divided particles. The paste did not form agglomerates in storage.

EXAMPLE 6

Zinc ethylene bis N,N'-(2-cyanoethyl dithiocarbamate) was prepared by adding an aqueous solution of zinc sulfate to a solution of sodium ethylene bis N,N'-(2-cyanoethyl dithiocarbamate) in the usual manner. The zinc salt was filtered off, and after washing the filter cake was analyzed and found to contain approximately 40% zinc salt and the remainder water.

To substantially 4540 parts by weight of the above described filter cake composite there was mixed 70 parts by weight of a 30% aqueous solution of dodecyl benzene monosodium sulfonate and 100 parts by weight of substantially a 50% aqueous solution of an ammonia neutralized formaldehyde-sulfonated naphthalene condensation product. A thin creamy paste was obtained which readily dispersed in water to form an excellent dispersion made up of finely divided particles uniformly dispersed. The paste flowed freely, was non-lumpy, and did not form agglomerates in storage. The incorporation of a clay produced a thicker paste.

EXAMPLE 7

Zinc N-ethyl N-2-cyanoethyl dithiocarbamate was prepared in the usual manner by adding an aqueous solution of zinc sulfate to a solution of sodium N-ethyl N-2-cyanoethyl dithiocarbamate. The zinc salt was filtered off, washed and the filter cake analyzed. The filter cake composite contained by weight approximately 34% zinc salt and the remainder water.

To 4540 parts by weight of the above described filter cake composite was mixed 150 parts by weight of substantially a 50% solution of an ammonia neutralized formaldehyde-sulfonated naphthalene condensation product and 50 parts by weight of a 30% aqueous solution of dodecyl benzene monosodium sulfonate. A thick creamy paste was obtained which readily dispersed in water to form a uniform stable dispersion made up of finely divided particles. The paste flowed freely and exhibited good stability and retention of particle size in storage.

As exemplary of the utility of the new and improved compositions the following is intended.

EXAMPLE 8

A spray composition was prepared containing three pounds of the zinc dimethyl dithiocarbamate paste composition of Example 3, said composition consisting of substantially 51% by weight zinc dimethyl dithiocarbamate, 0.3% by weight dodecyl benzene monosodium sulfonate, 0.4% by weight of an ammonia neutralized formaldehyde-sulfonated naphthalene condensation product, and the remainder being water, dispersed in 100 gallons of water. This spray was applied to a field of potatoes at the rate of 125 gallons per acre and the results compared to potatoes treated with a spray composition containing 1.5 pounds of a commercial dry zinc dimethyl dithiocarbamate fungicide dispersed in 100 gallons of water and applied at the same gallonage per acre. The new toxicant composition was 15 to 20% more effective in controlling late blight than the spray composition containing the commercial zinc dimethyl dithiocarbamate fungicide. Furthermore, there was no evidence of phytotoxicity.

EXAMPLE 9

A spray composition was prepared containing substantially 3 pounds of the biological toxicant paste composition of Example 3, said composition consisting substantially of 51% by weight of zinc dimethyl dithiocarbamate, 0.3% of dodecyl benzene monosodium sulfonate, and 0.4% of an ammonia neutralized formaldehyde-sulfonated naphthalene condensation product, the remainder being water, dispersed in 100 gallons of water. This spray composition was applied in the conventional manner to a field of tomatoes in Northern Ohio at the rate of 125 gallons per acre and was compared to commercial zinc dimethyl dithiocarbamate toxicants at the same spray concentration and at the same gallonage per acre. The following results were obtained:

*Table I*

| Toxicant | Amt. of toxicant per acre/lbs. | Control of anthracnose, percent | Foliage alive Sept. 18, percent | Culls, percent | Net marketable yield, tons/acre |
|---|---|---|---|---|---|
| Product of Example 3 | 1.88 | 98.1 | 64 | 7.5 | 13.2 |
| Commercial fungicide mixture of metal salts of dimethyl dithiocarbamic acid, containing 85% zinc salt | 1.88 | 98.1 | 60 | 9.8 | 11.2 |
| Commercial zinc dimethyl dithiocarbamate fungicide | 1.88 | 96.3 | 50 | 11.4 | 12.4 |
| Check | | 87.2 | 24 | 25.0 | 10.9 |

As further exemplary of the invention the following is illustrative and is not to be construed as limitative thereof.

EXAMPLE 10

Zinc dimethyl dithiocarbamate was made by adding to an aqueous solution of zinc sulfate an aqueous solution of a soluble dithiocarbamate salt, which contained a small amount of both dodecyl benzene monosodium sulfonate and an ethylene oxide-abietic acid non-resinous condensation product. The zinc salt was filtered off and washed free of sulfates. To 50 parts by weight of the filter cake, which contained substantially 50% by weight zinc dimethyl dithiocarbamate, was added 2 parts by weight of an aqueous solution containing about 15% dodecyl benzene sodium sulfonate, about 13% of an ammonia neutralized formaldehyde-sulfonated naphthalene condensation product and about 25% of an ethylene oxide-abietic acid non-resinous condensation product. The thin free flowing paste so formed contained approximately 48% by weight zinc dimethyl dithiocarbamate, 2% of a mixture of surface active agents and the remainder water. The paste was stirred into rubber latex in the proportion shown below and the latex composition compared to a similar stock containing a dispersion of ordinary dry zinc dimethyl dithiocarbamate.

Following the practice used in compounding latex, 50 parts by weight of dry zinc dimethyl dithiocarbamate typical of the product used in the rubber art was added with agitation to 50 parts by weight of substantially a 4% aqueous solution of ammonium caseinate and the dispersion ball milled for at least 48 hours. The dispersion so formed contained approximately 50% zinc dimethyl dithiocarbamate, approximately 2% ammonium caseinate, and the remainder water.

The above described zinc dimethyl dithiocarbamate dispersions were then compounded in a typical Hevea latex formulation comprising

| Stock | A | B |
|---|---|---|
| Rubber as 60% Hevea latex parts by weight | 100 | 100 |
| Zinc oxide do | 1 | 1 |
| Sulfur do | 1.5 | 1.5 |
| Dispersion of dry vulcanization accelerator consisting of by weight 50% zinc dimethyl dithiocarbamate, 2% ammonium caseinate, and 48% water parts by weight | 2.4 | |
| Undried paste zinc dimethyl dithiocarbamate consisting of by weight 48% zinc dimethyl dithiocarbamate, 2% of a mixture of surface active agents above described, and 50% water parts by weight | | 2.4 |

The above stocks so compounded were vulcanized in the usual manner for various periods of time at 100° C. in water. The physical data obtained is as follows:

Table II

| Stock | Minutes' cure at 100° C. in water | Modulus in lbs./in.² | | Tensile in lbs./in.² | Elong. in percent |
|---|---|---|---|---|---|
| | | 500% | 700% | | |
| A | 10 | | 703 | 1,753 | 837 |
| B | 10 | 225 | 1,350 | 3,065 | 870 |
| A | 20 | | 1,110 | 2,880 | 865 |
| B | 20 | 283 | 1,590 | 4,150 | 887 |
| A | 30 | | 1,250 | 2,790 | 847 |
| B | 30 | 367 | 1,823 | 4,347 | 887 |
| A | 60 | | 1,523 | 2,975 | 860 |
| B | 60 | 403 | 2,110 | 4,603 | 863 |

What is claimed is:

1. The method of making a water dispersible concentrate of a water insoluble salt of a dithiocarbamic acid which comprises admixing in aqueous medium an ionizable water soluble salt of a dithiocarbamic acid and an ionizable water soluble salt containing a cation which forms a water insoluble salt of the dithiocarbamic acid in quantity sufficient to precipitate the latter from solution, filtering from solution the said water insoluble salt and then admixing the water wet filter cake of said water insoluble salt with a surface active agent in sufficient quantity to form a free flowing rapidly water dispersible paste.

2. The method of making a water dispersible concentrate of a water insoluble salt of a dithiocarbamic acid which comprises gradually adding an ionizable water soluble salt of a dithiocarbamic acid to an aqueous solution of an ionizable water soluble salt containing a cation which forms a water insoluble salt of the dithiocarbamic acid in quantity sufficient to precipitate the latter from solution, the reaction medium having a surface active agent dissolved therein, filtering from solution the said water insoluble salt and then admixing the water wet filter cake of said water insoluble salt with a surface active agent in sufficient quantity to form a free flowing rapidly water dispersible paste.

3. The method of making a water dispersible concentrate of zinc dimethyl dithiocarbamate which comprises admixing in aqueous medium sodium dimethyl dithiocarbamate and a water soluble zinc salt in quantity sufficient to precipitate the zinc dimethyl dithiocarbamate from solution, filtering from solution the said water insoluble salt and then admixing the water wet filter cake of said water insoluble salt with a surface active agent in sufficient quantity to form a free flowing rapidly water dispersible paste.

4. The method of making a water dispersible concentrate of ferric dimethyl dithiocarbamate which comprises admixing in aqueous medium sodium dimethyl dithiocarbamate and a water soluble ferric salt in quantity sufficient to precipitate the ferric dimethyl dithiocarbamate from solution, filtering from solution the said water insoluble salt and then admixing the water wet filter cake of said water insoluble salt with a surface active agent in sufficient quantity to form a free flowing rapidly water dispersible paste.

5. The method of making a water dispersible concentrate of a water insoluble salt of a dithiocarbamic acid which comprises admixing in aqueous medium an ionizable water soluble salt of a dithiocarbamic acid and an ionizable water soluble salt containing a cation which forms a water insoluble salt of the dithiocarbamic acid in quantity sufficient to precipitate the latter from solution, filtering from solution the said water insoluble salt and then admixing the water wet filter cake of said water insoluble salt with a surface active agent comprising the neutralized condensation product of formaldehyde and sulfonated naphthalene in sufficient quantity to form a free flowing rapidly water dispersible paste.

6. The method of making a water dispersible concentrate of a water insoluble salt of a dithiocarbamic acid which comprises admixing in aqueous medium an ionizable water soluble salt of a dithiocarbamic acid and an ionizable water soluble salt containing a cation which forms a water insoluble salt of the dithiocarbamic acid in quantity sufficient to precipitate the latter from solution, filtering from solution the said water insoluble salt and then admixing the water wet filter cake of said water insoluble salt with a surface active agent comprising the neutralized condensation product of formaldehyde and sulfonated naphthalene and a salt of an alkylated aryl hydrocarbon sulfonate in sufficient quantity to form a free flowing rapidly water dispersible paste.

7. A water dispersible paste concentrate prepared by the method of claim 1.

8. A water dispersible paste concentrate prepared by the method of claim 2.

9. A water dispersible paste concentrate prepared by the method of claim 3.

10. A water dispersible paste concentrate prepared by the method of claim 4.

11. A water dispersible paste concentrate prepared by the method of claim 5.

12. A water dispersible paste concentrate prepared by the method of claim 6.

ELMER A. FIKE.
HAROLD E. BRUNER.

References Cited in the file of this patent

UNITED STATES PATENTS

| Number | Name | Date |
|---|---|---|
| 1,336,759 | Schmidt | Apr. 13, 1920 |
| 1,972,961 | Tisdale et al. | Sept. 11, 1934 |
| 2,433,160 | Gallagher et al. | June 8, 1948 |

OTHER REFERENCES

Goldsworthy et al., Journal Agr. Research, volume 66, pages 277, 291 (1934).